United States Patent
Maruyama et al.

(10) Patent No.: US 12,017,624 B2
(45) Date of Patent: Jun. 25, 2024

(54) VEHICULAR BRAKE DEVICE

(71) Applicant: ADVICS CO., LTD., Kariya (JP)

(72) Inventors: Masaki Maruyama, Kariya (JP); Yoshio Masuda, Kariya (JP); Shunya Watanabe, Kariya (JP)

(73) Assignee: ADVICS CO., LTD., Kariya (JP)

( * ) Notice: Subject to any disclaimer, the term of this patent is extended or adjusted under 35 U.S.C. 154(b) by 545 days.

(21) Appl. No.: 17/288,034

(22) PCT Filed: Nov. 18, 2019

(86) PCT No.: PCT/JP2019/045015
§ 371 (c)(1),
(2) Date: Apr. 23, 2021

(87) PCT Pub. No.: WO2020/105573
PCT Pub. Date: May 28, 2020

(65) Prior Publication Data
US 2021/0394733 A1  Dec. 23, 2021

(30) Foreign Application Priority Data

Nov. 19, 2018 (JP) ................................. 2018-216902

(51) Int. Cl.
*B60T 13/66* (2006.01)
*B60T 8/17* (2006.01)
(Continued)

(52) U.S. Cl.
CPC ............. *B60T 13/662* (2013.01); *B60T 8/17* (2013.01); *B60T 13/686* (2013.01); *B60T 13/62* (2013.01);
(Continued)

(58) Field of Classification Search
CPC .......... B60T 8/17; B60T 13/62; B60T 13/662; B60T 13/686; B60T 13/66; B60T 13/68; B60T 2270/402; B60T 2270/82
See application file for complete search history.

(56) References Cited

U.S. PATENT DOCUMENTS 5,927,824 A * 7/1999 Pahl ...................... B60T 8/4054
303/116.1
6,273,525 B1 * 8/2001 Erban ...................... B60T 8/172
303/113.2
(Continued)

FOREIGN PATENT DOCUMENTS

CN   105050870 A * 11/2015 ............ B60T 13/146
CN   105228870 A * 1/2016 .......... B60L 15/2009
(Continued)

OTHER PUBLICATIONS

International Search Report (PCT/ISA/210) and Written Opinion (PCT/ISA/237) dated Jan. 7, 2020, by the Japan Patent Office as the International Searching Authority for International Application No. PCT/JP2019/045015.

*Primary Examiner* — Thomas J Williams
(74) *Attorney, Agent, or Firm* — BUCHANAN INGERSOLL & ROONEY PC

(57) ABSTRACT

A vehicle braking device includes a first supply unit supplying fluid to main flow channels connected to wheel cylinders of a vehicle, a differential solenoid valve provided on the main flow channels and generating a differential pressure across the differential solenoid valve, a second supply unit supplying fluid to the wheel cylinders by drawing at least some fluid supplied from the first supply unit through branch flow channels branching off from the main flow channels upstream of the differential solenoid valve, and a setting unit setting a supply amount of fluid supplied from the first supply unit in accordance with a draw amount of fluid drawn by the second supply unit.

14 Claims, 4 Drawing Sheets

(51) Int. Cl.
*B60T 13/68* (2006.01)
*B60T 13/62* (2006.01)
(52) U.S. Cl.
CPC ..... *B60T 2270/402* (2013.01); *B60T 2270/82* (2013.01)

(56) References Cited

U.S. PATENT DOCUMENTS

| | | | | |
|---|---|---|---|---|
| 6,290,306 B1* | 9/2001 | Friedow | ................... | B60T 8/34 |
| | | | | 303/116.1 |
| 6,398,318 B1* | 6/2002 | Braun | ................... | B60T 8/885 |
| | | | | 303/122.08 |
| 2002/0043875 A1* | 4/2002 | Braun | ................... | B60T 8/885 |
| | | | | 303/166 |
| 2002/0183902 A1* | 12/2002 | Koerner | ................... | B60T 8/96 |
| | | | | 701/33.9 |
| 2009/0199555 A1* | 8/2009 | Hatano | ................ | B60T 13/686 |
| | | | | 60/545 |
| 2010/0001577 A1* | 1/2010 | Hatano | ................ | B60T 8/4081 |
| | | | | 303/3 |
| 2017/0274880 A1* | 9/2017 | Nishiwaki | ............. | B60T 13/686 |
| 2019/0092303 A1* | 3/2019 | Kato | ................... | B60T 8/4081 |
| 2021/0394733 A1* | 12/2021 | Maruyama | ................ | B60T 8/00 |

FOREIGN PATENT DOCUMENTS

| | | | |
|---|---|---|---|
| JP | 2009227023 A | 10/2009 | |
| JP | 2016097892 A | 5/2016 | |

* cited by examiner

VEHICULAR BRAKE DEVICE

TECHNICAL FIELD

The present disclosure relates to a vehicle braking device.

BACKGROUND ART

There is a vehicle braking device including an upstream pressure device increasing a wheel pressure as a hydraulic pressure of a wheel cylinder and a pressure regulating device regulating a pressure of fluid supplied from the upstream pressure device and supplying fluid to the wheel cylinder. As the pressure regulating device is, for example, an actuator having a pressurizing function by a pump, which can be regarded as a downstream pressure device. The vehicle braking device having the pressure devices on upstream and downstream respectively is configured to draw fluid supplied from the upstream pressure device by the pump at the time of pressurization by the actuator as described in, for example, JP-A-2016-97892.

CITATION LIST

Patent Literature

PTL 1: JP-A-2016-97892

SUMMARY

Technical Problem

In the above vehicle braking device, when pressurization is performed in the pressure regulating device in conjunction with pressurization in the upstream pressure device, for example, for assisting pressurization of the wheel pressure, the pressure regulating device uses fluid supplied from the upstream pressure device. In such case, at least part of fluid supplied from the upstream pressure device is drawn by the pump and is supplied to the wheel cylinder through the pump. Accordingly, fluid shortage occurs on the upstream side when the pump is driven, which affects the responsiveness in pressurization temporarily. That is, there is a room for improvement in the above vehicle braking device from a viewpoint of improving the responsiveness of a braking force.

The present disclosure has been made in view of the above circumstances, and an object thereof is to provide a vehicle braking device capable of improving the responsiveness of the braking force.

Solution to Problem

A vehicle braking device according to the present disclosure includes a first supply unit supplying fluid to a main flow channel connected to a wheel cylinder of a vehicle, a differential solenoid valve provided in the main flow channel and generating a differential pressure across the differential solenoid valve, a second supply unit supplying fluid to the wheel cylinder by drawing at least some fluid supplied from the first supply unit through a branch flow channel branching off from the main flow channel upstream of the differential solenoid valve, and a setting unit setting a supply amount of fluid supplied from the first supply unit in accordance with a draw amount of fluid drawn by the second supply unit.

Advantageous Effects

According to the present disclosure, the supply amount of fluid from the first supply unit can be set in consideration of the effect on the wheel pressure due to variation in the draw amount by the second supply unit. For example, the supply amount of fluid from the first supply unit is set so as to respond to temporary fluid shortage by the driving of the second supply unit, thereby suppressing temporary delay of pressurization. As described above, the responsiveness of the braking force can be improved according to the present disclosure.

DESCRIPTION OF EMBODIMENTS

Figure 1:
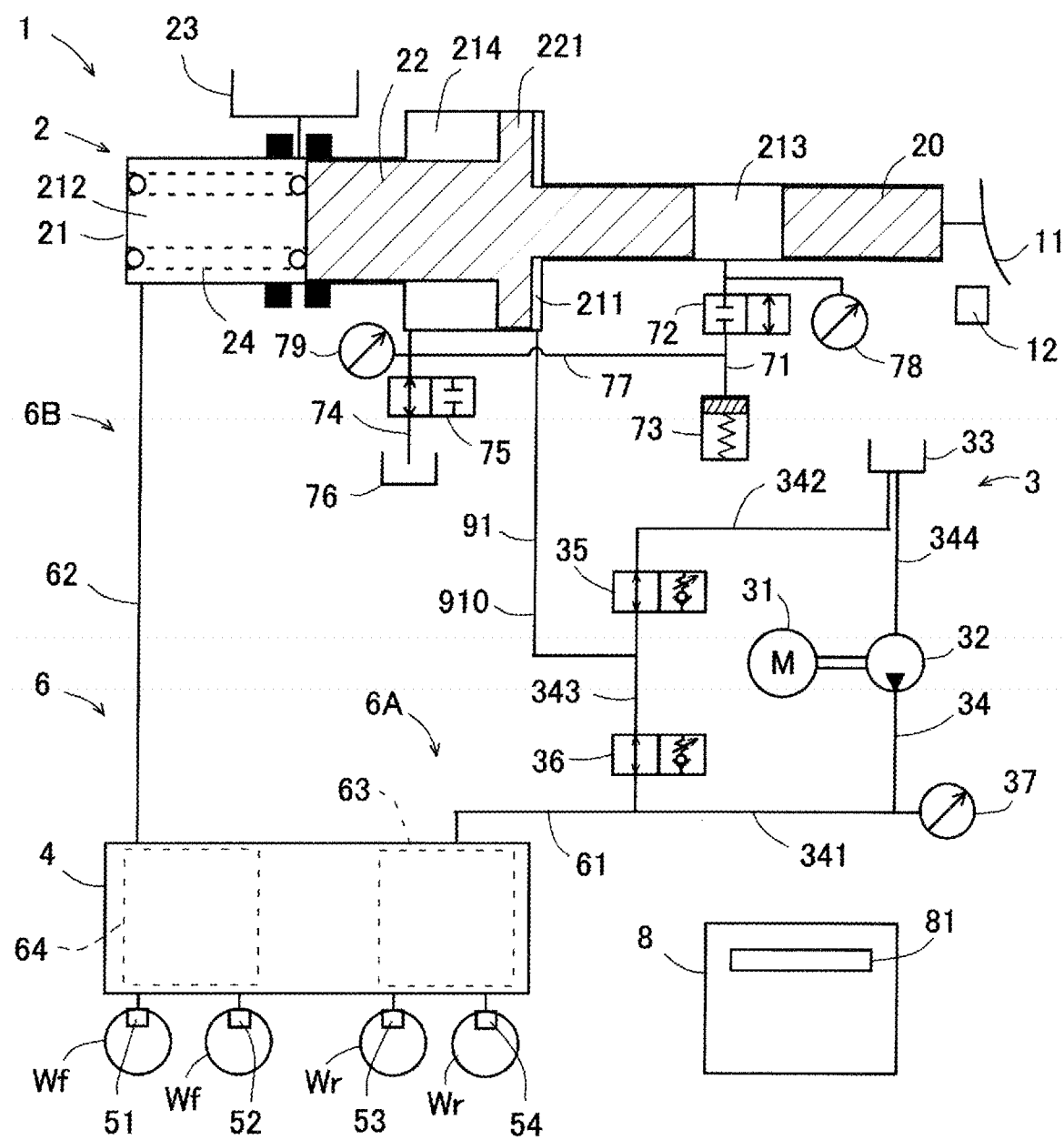
FIG. 1 is a configuration diagram of a vehicle braking device according to the embodiment.
Figure 2:
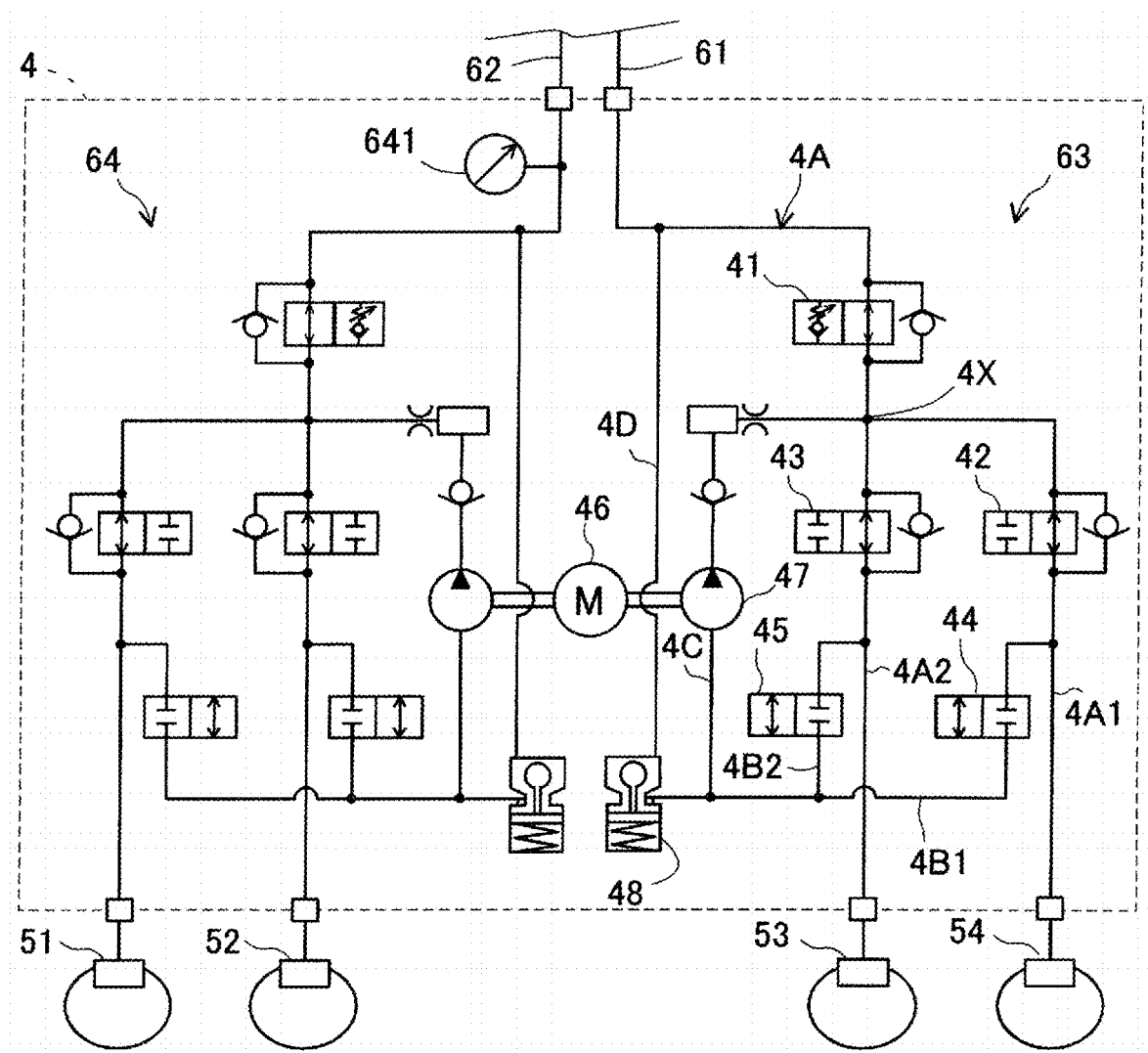
FIG. 2 is a configuration diagram of an actuator according to the embodiment.

Hereinafter, an embodiment of the present disclosure will be explained with reference to the drawings. Respective drawings used for explanation are schematic drawings, and shapes of respective parts are not strictly drawn. A vehicle braking device 1 according to the embodiment includes a master cylinder 2, a fluid supply unit 3, an actuator 4, wheel cylinders 51, 52, 53, and 54, a hydraulic circuit 6, and a brake ECU 8 as shown in FIG. 1.

The master cylinder 2 is a device configured to supply fluid to the wheel cylinders 51, 52 of front wheels Wf. The master cylinder 2 includes an input piston 20, a cylinder 21, a master piston (corresponding to a "piston") 22, a reservoir 23, and a spring 24. The input piston 20 is a piston member, sliding inside the cylinder 21 in conjunction with an operation of a brake pedal 11 as a brake operation member. The vehicle braking device 1 is provided with a stroke sensor 12 for detecting a stroke of the brake pedal 11.

The cylinder 21 is a cylinder member in which an internal space is sectioned into an input chamber 211 and an output chamber 212 by the master piston 22. More specifically, the input chamber 211, the output chamber 212, a reaction force chamber 213, and a regulation chamber 214 are formed inside the cylinder 21. The input chamber 211 and the output chamber 212 are described later.

The reaction force chamber 213 is sectioned by the input piston 20 and the master piston 22. The master piston 22 and the input piston 20 are disposed so as to face each other and apart from each other by a predetermined distance, namely, through the reaction force chamber 213. The reaction force chamber 213 is connected to a stroke simulator 73 through a flow channel 71 and a normally-closed type solenoid valve 72. A reaction force with respect to forward movement of the input piston 20 as a hydraulic pressure of the reaction force chamber 213 is formed by the stroke simulator 73 in an opened state of the solenoid valve 72. A pressure sensor 78 connected to the flow channel 71 detects a reaction force pressure as a hydraulic pressure of the reaction force chamber 213 and a pedaling force of a driver with respect to the brake pedal 11.

The regulation chamber 214 is sectioned by the master piston 22. The regulation chamber 214 is formed so that a volume is reduced when the master piston 22 moves forward and that the volume is increased when the master piston 22 moves backward. The regulation chamber 214 is connected to a reservoir 76 through a flow channel 74 and a normally-open type solenoid valve 75. A portion in the flow channel 74 between the solenoid valve 75 and the regulation chamber 214 is connected to a portion in the flow channel 71 between the solenoid valve 72 and the stroke simulator 73 through a flow channel 77. A pressure sensor 79 connected to the flow channel 74 detects a hydraulic pressure of the regulation chamber 214.

The master piston 22 is a piston member disposed inside the cylinder 21. The master piston 22 slides inside the cylinder 21 so as to change a volume of the output chamber 212, which is driven by a force corresponding to a hydraulic pressure in the input chamber 211 to thereby generate a hydraulic pressure (hereinafter referred to as a "master pressure") in the output chamber 212. The master piston 22 has a large-diameter part 221 formed to be larger in diameter than other portions so as to separate the input chamber 211 and the regulation chamber 214.

The input chamber 211 is a so-called servo chamber, which is formed behind the large-diameter part 221 of the master piston 22. The input chamber 211 is formed to face the regulation chamber 214 through the large-diameter part 221. A hydraulic pressure in the input chamber 211 (hereinafter referred to as a "servo pressure") will be a drive force for pressing a rear end face of the large-diameter part 211 and moving the master piston 22 forward. The fluid supply unit is connected to the input chamber 211 through a later-described connection flow channel 91.

The output chamber 212 is a so-called master chamber, which is formed on a bottom side of the cylinder 21, namely, in front of the master piston 22. The output chamber 212 is formed so that a volume is reduced when the master piston 22 moves forward and that the volume is increased when the master piston 22 moves backward. The output chamber 212 is connected to the actuator 4 through a second flow channel 62.

The reservoir 23 is a tank storing fluid, which is kept in atmospheric pressure. A flow channel connecting the reservoir 23 and the output chamber 212 communicates when the master piston 22 is in an initial position and is blocked when the master piston 22 moves forward by a predetermined distance from the initial position. The spring 24 presses the master piston 22 toward the initial position (namely, backward).

The fluid supply unit 3 is a device for supplying fluid to the actuator 4 and the connection flow channel 91. The fluid supply unit 3 supplies fluid to a first hydraulic circuit 63 inside the actuator 4 through a flow channel 61. The first hydraulic circuit 63 is connected to the wheel cylinders 53, 54. The connection flow channel 91 is a flow channel connecting the first flow channel 61 and the input chamber 211 of the master cylinder 2. When a later-described second solenoid valve 36 is in an open state or the second solenoid valve 36 does not exist, the fluid supplied to the connection flow channel 91 by the fluid supply unit 3 is supplied to the first hydraulic circuit 63 and the input chamber 211.

A transmission route of the hydraulic pressure from the fluid supply unit 3 to the wheel cylinders 51 to 54, that is, the hydraulic circuit 6 includes a first system 6A connected to the wheel cylinders 53, 54 of rear wheels Wr, a second system 6B connected to the wheel cylinders 51, 52 of the front wheels Wf, and the connection flow channel 91 connecting the first system 6A and the second system 6B. The first system 6A includes the first flow channel 61 and the first hydraulic circuit 63. The second system 6B includes the master cylinder 2, the second flow channel 62, and a second hydraulic circuit 64 inside the actuator 4. The second hydraulic circuit 64 is connected to the wheel cylinders 51, 52.

The fluid supply unit 3 includes a motor 31, a pump 32, a reservoir 33, an annular flow channel 34, a first solenoid valve 35, and the second solenoid valve 36. The motor 31 is drive-controlled by the brake ECU 8, which drives the pump 32. The pump 32 is, for example, a gear pump, which is driven by a drive force of the motor 31. The pump 32 draws fluid stored in the reservoir 33 and supplies fluid to the first flow channel 61 and the connection flow channel 91. The annular flow channel 34 is a flow channel connecting a supply port and a suction port of the pump 32, which is configured by flow channels 341, 342, 343, and 344.

The flow channel 341 connects the supply port of the pump 32 to the first flow channel 61 and the connection flow channel 91. The flow channel 342 connects the connection flow channel 91 and the reservoir 33. On the flow channel 342, the first solenoid valve 35 is provided. The flow channel 343 is a portion connecting the flow channel 341 and the flow channel 342 in the connection flow channel 91. That is, the connection flow channel 91 is configured by a flow channel 910 connecting the input chamber 211 and the annular flow channel 34, and the flow channel 343 as part of the annular flow channel 34. The second solenoid valve 36 is provided on the flow channel 343, namely, part of a section of the connection flow channel 91. The flow channel 344 connects the reservoir 33 and the suction port of the pump 32.

A pressure sensor 37 for detecting a hydraulic pressure in the flow channel 341 and the first flow channel 61 is provided on the flow channel 341. The hydraulic pressure detected by the pressure sensor 37 can be regarded as a hydraulic pressure supplied to the first hydraulic circuit 63 and the connection flow channel 91 by the pump 32. The servo pressure as the hydraulic pressure of the input chamber 211 varies according to a control state of the second solenoid valve 36. In the embodiment, the reservoir 33, the reservoir 76, and the reservoir 23 are configured by one common reservoir (for example, the reservoir 23).

The first solenoid valve 35 and the second solenoid valve 36 are normally-open type solenoid valves, which are linear valves capable of controlling a differential pressure across the first solenoid valve 35 or the second solenoid valve 36. The first solenoid valve 35 and the second solenoid valve 36 set the hydraulic pressure in upstream of itself to be higher than the hydraulic pressure in downstream of itself based on the magnitude of control current from the brake ECU 8. A target differential pressure across the first solenoid valve 35 and the second solenoid valve 36 is determined according to the magnitude of the control current. The first solenoid valve 35 and the second solenoid valve 36 can form a throttled state in the flow channel according to the control current.

The brake ECU 8 sets a target wheel pressure with respect to the stroke and/or the pedaling force, then, controls the target differential pressure across the first solenoid valve 35 and drives the pump 32. Accordingly, a hydraulic pressure in upstream, where the pump 32 locates, of the first solenoid valve 35 can be set higher than a hydraulic pressure in the reservoir 33 (atmospheric pressure in this case) as a hydraulic pressure in downstream of the first solenoid valve 35 by the target differential pressure. The brake ECU 8 also controls the target differential pressure across the second solenoid valve 36 and drives the pump 32 when different hydraulic pressures are generated in respective systems 6A, 6B without using the actuator 4. Accordingly, a hydraulic pressure in upstream, where pump 32 locates, of the second solenoid valve 36 can be set higher than a hydraulic pressure in the flow channel between the second solenoid valve 36 and the first solenoid valve 35 as the downstream the second solenoid valve 36, namely, the servo pressure by the target differential pressure.

The brake ECU 8 controls the first solenoid valve 35 and does not control the second solenoid valve 36 when the same wheel pressure is generated in the front and rear wheels Wf, Wr. The second solenoid valve 36 is used when controlling the hydraulic pressure in the wheel cylinders 51, 52 of the front wheels Wf to be lower than the hydraulic pressure in the wheel cylinders 53, 54 of the rear wheels Wr, for example, in consideration of a regenerative braking force to be generated in the front wheels Wf.

The actuator 4 is a so-called ESC actuator configured so as to increase respective wheel pressures. The actuator 4 includes the first hydraulic circuit 63, the second hydraulic circuit 64, solenoid valves 41 to 45, a motor 46, pumps 47, and pressure regulating reservoirs (corresponding to reservoirs) 48. When the brake ECU 8 controls the solenoid valves 41 to 45 and the pumps 47 arranged at respective hydraulic circuits 63, 64, thereby increasing, reducing, or keeping respective wheel pressures. The actuator 4 may also execute antiskid control or sideslip prevention control based on a command from the brake ECU 8. A pressure sensor 641 for detecting the master pressure is provided at the second hydraulic circuit 64 or on the second flow channel 62.

The configuration of the actuator 4 will be explained by using the first hydraulic circuit 63 as an example. A flow channel 4A is a flow channel connecting the first flow channel 61 and the wheel cylinders 53, 54. The flow channel 4A branches off into a flow channel 4A1 connecting to the wheel cylinder 54 and a flow channel 4A2 connecting to the wheel cylinder 53 at a branch point 4X. The solenoid valve (corresponding to a "differential-pressure solenoid valve") 41 is a normally-open type linear valve provided at a portion on upstream of the branch point 4X on the flow channel 4A. The differential pressure across the solenoid valve 41 can be controlled so that the pressure becomes high on the side of the branch point 4X by the solenoid valve 41.

The solenoid valve 42 is a normally-open type linear valve provided on the flow channel 4A1. The solenoid valve 43 is a normally-open type linear valve provided on the flow channel 4A2. The solenoid valve (corresponding to a "pressure-reducing solenoid valve") 44 is a normally-closed type on-off valve provided on a flow channel 4B1. The flow channel 4B1 is a flow channel connecting a portion between the solenoid valve 42 and the wheel cylinder 54 on the flow channel 4A1, and the pressure-regulating reservoir 48. The solenoid valve (corresponding to a "pressure-reducing solenoid valve") 45 is a normally-closed type on-off valve provided on a flow channel 4B2. The flow channel 4B2 is a flow channel connecting a portion between the solenoid valve 43 and the wheel cylinder on the flow channel 4A2, and the pressure-regulating reservoir 48. When the solenoid valves 44, 45 are opened, the wheel pressure can be reduced.

The pump 47 is provided on a flow channel 4C, which is driven by driving the motor 46. The flow channel 4C is a flow channel connecting the pressure-regulating reservoir 48 and the branch point 4X. The pressure-regulating reservoir 48 is connected to the first flow channel 61 by a flow channel 4D. When the pump 47 is driven, fluid is drawn from the pressure-regulating reservoir 48 and supplied toward the branch point 4X. For example, when the hydraulic pressure of the wheel cylinder 54 is reduced by the antiskid control, the brake ECU 8 drives the pump 47, closes the solenoid valve 42, and opens the solenoid valve 44.

The brake ECU 8 drives the pump 47 and controls the target differential pressure across the solenoid valve 41 at the time of increasing the wheel pressure by the actuator 4. Accordingly, a hydraulic pressure at a portion on the side of the branch point 4X of the solenoid valve 41 in the flow channel 4A is increased according to the target differential pressure across the solenoid valve 41. When the actuator 4 is not activated, the fluid supplied from the fluid supply part 3 is supplied to the wheel cylinders 53, 54 through the flow channel 4A. The same applies to the configuration in the second hydraulic circuit 64. The fluid is supplied to the second hydraulic circuit 64 through the master cylinder 2 and the second flow channel 62.

The brake ECU 8 is an electronic control unit including a CPU, a memory, and the like. The brake ECU 8 is a device controlling mainly the fluid supply unit 3 and the actuator 4 based on information from various sensors. When the brake pedal 11 is operated, the brake ECU 8 sets a target deceleration and the target wheel pressure in accordance with the stroke and/or the pedaling force. The brake ECU 8 also opens the solenoid valve 72 and closes the solenoid valve 75 when the brake pedal 11 is operated. Accordingly, a channel between the regulation chamber 214 and the reservoir 76 is blocked and the reaction force chamber 213 and the regulation chamber 214 communicate with the stroke simulator 73. A hydraulic pressure corresponding to the operation of the brake pedal 11 is generated in the reaction force chamber 213 and the regulation chamber 214.

The brake ECU 8 controls the pump 32 and the first solenoid valve 35 in the fluid supply unit 3 in accordance with the target wheel pressure when the regenerative braking force is not generated. In this case, the second solenoid valve 36 is not controlled and the opened state due to non-conduction is maintained. The brake ECU 8 drives the pump 32 and sets the target differential pressure across the first solenoid valve 35 so as to correspond to the target wheel pressure, applying control current corresponding to the target differential pressure across the first solenoid valve 35.

The pump 32 draws fluid from the reservoir 33 and supplies fluid to the first system 6A. The fluid supplied from the pump 32 is also supplied to the input chamber 211 through the connection flow channel 91. A hydraulic pressure corresponding to the target differential pressure across the first solenoid valve 35 is generated in the input chamber 211 and the first system 6A.

When the servo pressure is increased by the above control, the master piston 22 moves forward, and the master pressure is increased. That is, the hydraulic pressure in the second flow channel 62 and the second hydraulic circuit 64 connected to the output chamber 212 is also increased. According to the control of the pump 32 and the first solenoid valve 35, a hydraulic pressure corresponding to the servo pressure is generated at respective wheel cylinders 51 to 54 through the both systems 6A, 6B. Accordingly, the brake ECU 8 executes braking control so as to achieve the target wheel pressure and achieve the target deceleration. Strictly, the hydraulic pressure in the second system 6B is slightly lower than the hydraulic pressure in the first system 6A due to sliding resistance and the like of the master piston 22. In vehicles having a regenerative braking device such as hybrid vehicles, the target differential pressure across the second solenoid valve 36 is controlled so that the target deceleration (target braking force) of the front wheels Wf is achieved by a sum of the regenerative braking force and the hydraulic braking force. The brake ECU 8 estimates respective wheel pressures based on detected values of the pressure sensors 37, 641 and a control state of the actuator 4.

(Pressure Assist Control)

The vehicle braking device 1 according to the embodiment includes the fluid supply unit 3 having the pump 32 as a first supply unit and the actuator 4 having the pump 47 as s second supply unit at each of the hydraulic circuits 63, 64 as described above. The vehicle braking device 1 includes the pump 32 for supplying fluid to the flow channel (corresponding to a "main flow channel") 4A connected to the wheel cylinders 53, 54 of the vehicle, the solenoid valve 41 provided on the flow channel 4A and generating a differential pressure across the solenoid valve 41, and the pump 47 drawing at least some fluid supplied from the pump 32 through the flow channels (corresponding to "branch flow channels") 4C, 4D branching off from the main flow channel 4A upstream of the solenoid valve 41 and supplying fluid to the wheel cylinders 53, 54. The target wheel pressure is set in accordance with the operation of the brake pedal 11 in the embodiment. The fluid supply unit 3 and the actuator 4 are controlled based on the set target wheel pressure. It can be said that the main flow channel connected to the wheel cylinders 53, 54 is configured by the flow channels 341, 61 and 4A.

Here, the brake ECU 8 according to the embodiment is configured to execute pressure assist control when the target wheel pressure becomes a predetermined value or more. The pressure assist control is control in which pressurization control by the actuator 4 is executed in addition to the pressurization control by the fluid supply unit 3. According to the configuration, an amount of fluid to be supplied can be reduced as compared with a pump capable of supplying fluid corresponding to the target wheel pressure of the predetermined value or more; therefore, the pump 32 can be reduced in size. Also in the following explanation, the operation of the actuator 4 will be explained by using the first hydraulic circuit 63 as an example.

When the brake ECU 8 executes the pressure assist control, the pump 47 is driven during the driving of the pump 32. The pump 47 draws fluid from the first flow channel 61 through the pressure regulating reservoir 48 and supplies fluid. The fluid supplied from the pump 47 is supplied to the wheel cylinders 53, 54 through the branch point 4X. That is, the vehicle braking device 1 includes the pump 32 supplying fluid to the wheel cylinders 53, 54 of the vehicle and the pump 47 drawing at least part of fluid supplied from the pump 32 and supplying fluid to the wheel cylinders 53, 54. The pump 32 according to the embodiment supplies fluid directly to the first hydraulic circuit 63 not through, for example, a hydraulic transmission mechanism such as a regulator and a cylinder member.

The brake ECU 8 includes a setting unit 81 as a function. The setting unit 81 sets a supply amount of fluid supplied from the pump 32 in the fluid supply unit 3 in accordance with a draw amount of fluid drawn by the pump 47 in the actuator 4. In the embodiment, the draw amount and the supply amount each means a fluid amount per a unit time, namely, a flow rate. In FIG. 3 to FIG. 6, for explanation, assuming a target pressure approximates an actual pressure, a "wheel pressure" indicates the target wheel pressure and an actual wheel pressure, and an "upstream pressure" indicates a target upstream pressure and an actual upstream pressure. The upstream pressure is detected by the pressure sensor 37.

Figure 3:
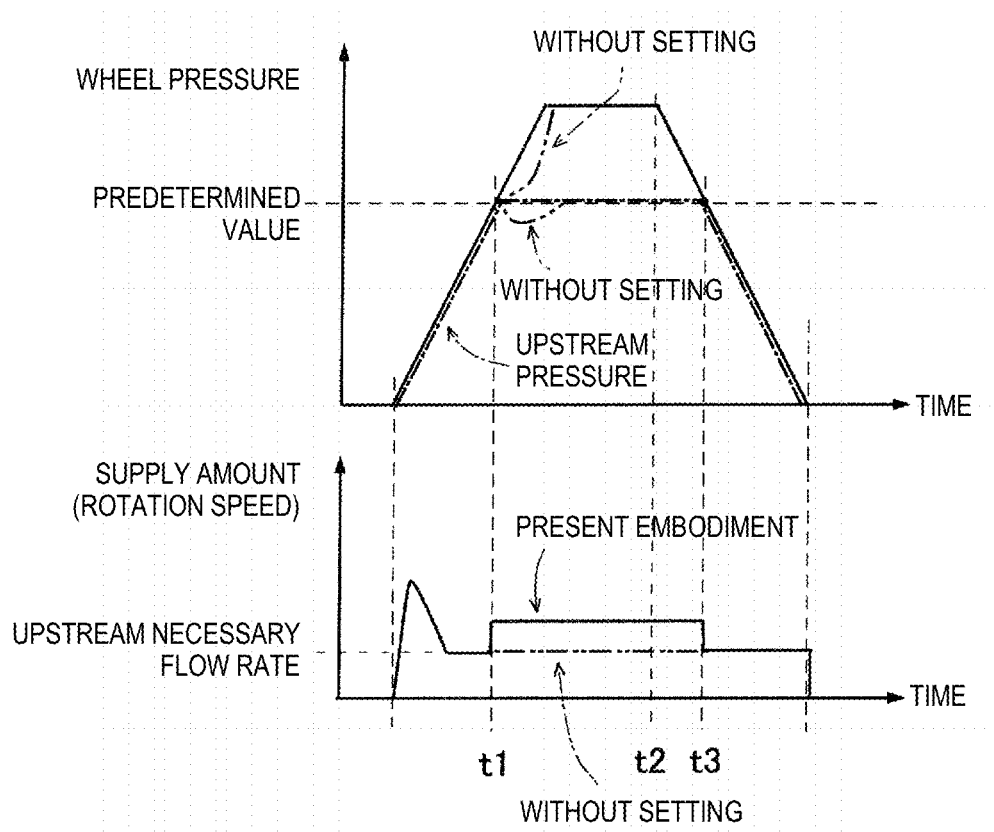
FIG. 3 is an explanatory view for explaining a control example according to the embodiment.

As shown in FIG. 3, when the target wheel pressure exceeds a predetermined value at "t1", the brake ECU 8 executes pressure assist control, driving the pump 47 of the actuator 4 and applying control current to the solenoid valve 41. Here, the setting unit 81 adds a value corresponding to the draw amount of the pump 47 by the driving of the pump 47 to the target supply amount of the pump 32. That is, the setting unit 81 increases the supply amount of the pump 32 according to the driving of the pump 47. In other words, the setting unit 81 increases rotation speed of the motor 31 according to the start of driving of the motor 46. In the actuator 4, the differential pressure across the solenoid value 41 is set according to the target wheel pressure with the driving of the pump 47.

As described above, the setting unit 81 increases the supply amount of the pump 32 in accordance with the draw amount of the pump 47 when the pump 47 is driven in a state where the pump 32 is supplying fluid. The setting unit 81 can grasp the draw amount of the pump 47 based on the rotation speed (control value) of the motor 46. For example, when the pump 47 is driven during the driving of the pump 32, the setting unit 81 sets a flow rate obtained by adding a flow rate drawn by the pump 47 to a flow rate necessary for controlling the upstream pressure as a supply flow rate of the pump 32. The flow rate necessary for controlling the upstream pressure (upstream necessary flow rate) can be regarded as a flow rate necessary for maintaining the target upstream pressure. The draw amount of the pump 47 may be, for example, previously set as well as calculated based on the rotation speed of the motor 46.

When the target wheel pressure is reduced from "t2" and the target wheel pressure becomes lower than the predetermined value at "t3", the brake ECU 8 ends the pressure assist control, stopping the pump 47 and releases the control of the solenoid valve 41. The setting unit 81 reduces the supply amount of the pump 32 which has been increased as compared with during the normal control in accordance with the stop of the pump 47 and returns the supply amount to the value at the time of normal control, namely, to the upstream necessary flow rate. A period during the normal control means a period during which specific control such as anti-skid control or the above pressure assist control is not executed. The setting unit 81 reduces the supply amount of the pump 32 which has been increased when the pump 47 is stopped after both the pump 32 and the pump 47 have been driven.

In a case where the pressure assist control is executed in a configuration not provided with the setting unit 81, when at least part of fluid supplied from the pump 32 is drawn by the pump 47, the fluid in the first flow channel 61 and the connection flow channel 91 is reduced, and the necessary flow rate on the upstream corresponding to the target upstream pressure temporarily becomes insufficient. Accordingly, the servo pressure and the hydraulic pressure supplied to the first hydraulic circuit 63 are temporarily reduced and the increase of the actual wheel pressure is temporarily delayed with respect to the increase of the target wheel pressure.

Here, the supply amount of the pump 32 can be set in consideration of the effect on the pressurization by draw of fluid by the pump 47 according to the embodiment. Accordingly, the supply amount of the pump 32 is increased so as to correspond to the driving of the pump 47 for eliminating the temporary response delay by the driving of the pump 47, thereby suppressing response delay. As the supply amount of the pump 32 which has been increased is reduced with the stop of the pump 47, the supply amount of the pump 32 corresponding to the target wheel pressure can be realized. As described above, the upstream pressure can be maintained at the target upstream pressure even when the driving state of the pump 47 changes during the driving of the pump 32 according to the embodiment, which can improve the responsiveness of the braking force.

(Another Control Example 1)

Figure 4:
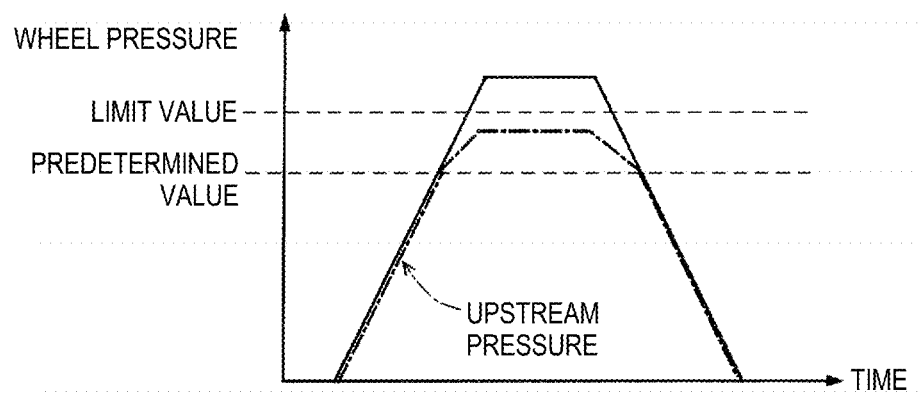
FIG. 4 is an explanatory view for explaining a control example according to the embodiment.

As another control example, when the target wheel pressure becomes higher than a predetermined value as shown in FIG. 4, the upstream pressure may be increased to a limit value which is set to a hydraulic pressure lower than the maximum output of the pump 32, namely, the achievable maximum upstream pressure by the fluid supply unit 3 in accordance with increase of the target wheel pressure. According to the control, generation of the upstream pressure by the fluid supply unit 3 can be adjusted to variation of the target wheel pressure as close as possible, and pressurization can be assisted by the actuator 4 for a hydraulic pressure insufficient with respect to the target wheel pressure. Also according to the configuration, when the driving state of the pump 47 in the actuator 4 varies, the setting unit 81 sets the supply amount of the pump 32 in accordance with the draw amount of the pump 47. As a result, the same advantages as described above can be obtained.

(Another Control Example 2)

Figure 5:
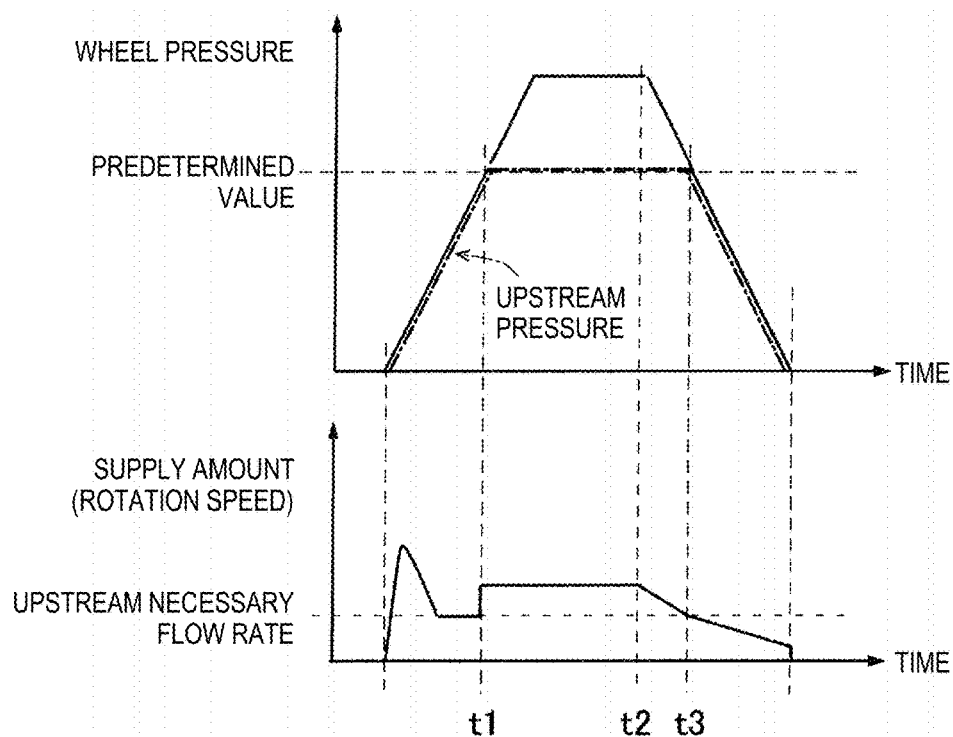
FIG. 5 is an explanatory view for explaining a control example according to the embodiment.

Moreover, when the target wheel pressure is reduced at "t2" as shown in FIG. 5, the setting unit 81 reduces the supply amount of the upstream pump 32 in accordance with the reduction. In this example, a supply amount added at the time of starting (t1) the pressure assist control becomes zero at the time of ending (t3) the pressure assist control. In a case where the solenoid valves 44, 45 are opened and the pump 47 is driven at the time of pressure reduction, fluid inside the wheel cylinders 53, 54 is pumped up by the pump 47. The pumped-up fluid is supplied to the branch point 4X by the pump 47. In this control, the pumped-up fluid is utilized as a necessary flow rate of the supply parts (the pumps 32, 47 in this case) to thereby suppress the supply amount of the supply parts. The setting unit 81 reduces the supply amount of the pump 32 in accordance with the reduction of the target wheel pressure also after the pressurization is performed only by the fluid supply unit 3.

As described above, the vehicle braking device 1 includes the flow channels 4B1, 4B2 connecting a suction port of the pump 47 and the wheel cylinders 53, 54, and the solenoid valves 44, 45 provided on the flow channels 4B1, 4B2. That is, the vehicle braking device 1 further includes the solenoid valves 44, 45 provided on the flow channels 4B1, 4B2 connecting the wheel cylinders 53, 54 and the pressure regulating reservoir 48. When the wheel pressure is reduced in the state where the pumps 32, 47 are driven, the setting unit 81 reduces the supply amount of the pump 32 and opens the solenoid valves 41, 44, and 45. As the pump 47 is driven and the solenoid valves 41, 44 and 45 are opened, fluid drawn from the wheel cylinders 53, 54 by the pump 47 flows to upstream (namely, toward the first flow channel 61), thereby reducing the supply amount of the pump 32 accordingly. That is, according to the configuration, a load of the pump 32 can be suppressed while keeping braking accuracy, which can reduce the size of the pump 32. The control can be also applied to a case of antiskid control.

(Another Control Example 3)

Figure 6:
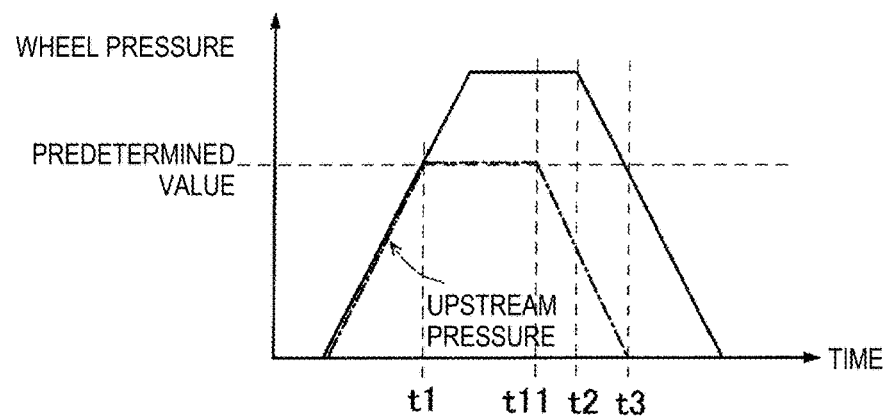
FIG. 6 is an explanatory view for explaining a control example according to the embodiment.

A main supply unit and a sub-supply unit may be interchanged by the control according to the situation. Specifically, the brake ECU 8 drives the pump 32 as the main supply unit until the pump 32 becomes in a prescribed state (t11), and drives the actuator 4 (pump 47) as the main supply unit after "t11" as shown in FIG. 6. The prescribed state is a state where heat or a load generated at the pump 32 exceeds a threshold value by driving the pump 32. The heat or the load can be calculated from driving time, the supply amount and the like.

In FIG. 6, only the fluid supply unit 3 is driven until "t1", and the actuator 4 is also driven during "t1" to "t11" by the pressure assist control. Then, the pump 32 becomes in the prescribed state at "t11" and the main supply unit is switched; therefore, pressurization by the fluid supply unit 3 is gradually reduced after "t11", and pressurization by the actuator 4 is increased. At a point where the target wheel pressure is reduced to the predetermined value (t3), pressurization by the fluid supply unit 3 is stopped and the wheel pressure is added only by the actuator 4.

As described above, the brake ECU 8 corresponding to the control unit reduces a ratio of the hydraulic pressure generated by the fluid supply unit 3 in the wheel pressure and increases a ratio of the hydraulic pressure generated by the actuator 4 in the wheel pressure when the pump 32 becomes in the prescribed state. The configuration can be applied to the vehicle braking device having two supply units regardless of the presence of the setting unit 81.

Reference Example

Figure 7:
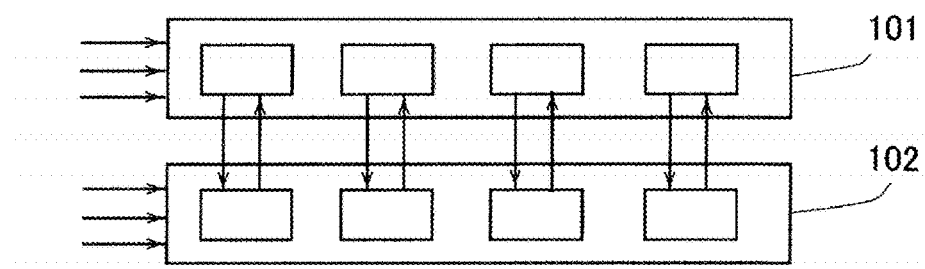
FIG. 7 is a diagram showing a reference example.

A system configuration example of the vehicle braking device including two supply units having the same functions, namely, the first supply unit and the second supply unit will be explained. The vehicle braking device includes an ECU 101 for controlling the first supply unit and an ECU 102 for controlling the second supply unit as shown in FIG. 7. The same signals (refer to arrows in FIG. 7) are inputted to the two ECUs 101, 102 from various sensors and the like. The two ECUs 101, 102 can exert various functions to corresponding supply units. The first supply unit and the second supply unit have the same functions as each other (refer to boxes in FIG. 7). According to the configuration, in a case where a main system fails during execution of control using one supply unit as the main system, the equivalent function can be exerted by the other supply unit as a sub-system. When one function in the main system fails, the function can be exerted at the sub-system. It is also possible to acquire common input information and communicate information with each other between the systems, thereby verifying the accuracy of calculation results in respective functions and increasing reliability. When there are some restrictions in one system, the one system can use calculation results of the other system. Such configuration is also effective for vehicles executing autonomous driving or regenerative cooperative control. Such configuration can be incorporated in the present embodiment.

(Others)

The present disclosure is not limited to the above embodiment. For example, the setting unit 81 may set the supply amount of the pump 32 in accordance with the draw amount of the pump 47 incases other than the pressure assist control. For example, when it is not necessary to supply different hydraulic pressures to upstream of the two systems 6A, 6B, the vehicle braking device 1 does not have to be provided with the second solenoid valve 36. In the vehicle in which the regenerative braking force is generated in one of the front and rear wheels Wf, Wr, it is sufficient that the hydraulic circuit (64) corresponding to wheels for generating the regenerative braking force is connected to the output chamber 212.

Moreover, the vehicle braking device 1 does not have to be provided with the master cylinder 2. In this case, for example, the connection flow channel 91 may be directly connected to the second system 6B not through the master cylinder 2. Also in this case, the pump 47 can draw at least some fluid supplied from the pump 32 and can supply fluid to the wheel cylinders 53, 54.

The invention claimed is:

1. A vehicle braking device comprising:
a first supply unit configured to supply fluid to a main flow channel connected to a wheel cylinder of a vehicle;
a flow channel having a first portion connecting a supply port of the first supply unit to a fluid reservoir and a second portion connecting the fluid reservoir to a suction port of the first supply unit;
a differential solenoid valve provided in the main flow channel, the differential solenoid valve configured to generate a differential pressure across the differential solenoid valve;
a second supply unit configured to supply fluid to the wheel cylinder by drawing at least some fluid supplied from the first supply unit through a branch flow channel branched off from the main flow channel upstream of the differential solenoid valve; and
a setting unit configured to set a supply amount of fluid supplied by the first supply unit in accordance with a draw amount of fluid drawn by the second supply unit.

2. The vehicle braking device according to claim 1, wherein the setting unit is configured to increase the supply amount by the first supply unit based on the draw amount by the second supply unit when the second supply unit is driven in a state where the first supply unit supply fluid.

3. The vehicle braking device according to claim 1, wherein the setting unit is configured to reduce the supply amount by the first supply unit when the second supply unit is stationary after the first supply unit and the second supply unit has been driven.

4. The vehicle braking device according to claim 1, further comprising:
a pressure-reducing solenoid valve provided in a flow channel connecting the wheel cylinder and a reservoir,
wherein the setting unit is configured to reduce the supply amount by the first supply unit and open the differential solenoid valve and the pressure-reducing solenoid valve when a hydraulic pressure in the wheel cylinders is reduced in the state where the first supply unit and the second supply unit are driven.

5. The vehicle braking device according to claim 1, further comprising:
a control unit configured to reduce a ratio of a hydraulic pressure generated by the first supply unit in the wheel cylinder and to increase a ratio of a hydraulic pressure generated by the second supply unit in the wheel cylinder when the first supply unit becomes in a prescribed state.

6. The vehicle braking device according to claim 2, wherein the setting unit is configured to reduce the supply amount by the first supply unit when the second supply unit is stationary after the first supply unit and the second supply unit has been driven.

7. The vehicle braking device according to claim 6, further comprising:
a pressure-reducing solenoid valve provided in a flow channel connecting the wheel cylinder and a reservoir,
wherein the setting unit is configured to reduce the supply amount by the first supply unit and open the differential solenoid valve and the pressure-reducing solenoid valve when a hydraulic pressure in the wheel cylinders is reduced in the state where the first supply unit and the second supply unit are driven.

8. The vehicle braking device according to claim 7, further comprising:
a control unit configured to reduce a ratio of a hydraulic pressure generated by the first supply unit in the wheel cylinder and to increase a ratio of a hydraulic pressure generated by the second supply unit in the wheel cylinder when the first supply unit becomes in a prescribed state.

9. The vehicle braking device according to claim 4, further comprising:
a control unit configured to reduce a ratio of a hydraulic pressure generated by the first supply unit in the wheel cylinder and to increase a ratio of a hydraulic pressure generated by the second supply unit in the wheel cylinder when the first supply unit becomes in a prescribed state.

10. The vehicle braking device according to claim 3, further comprising:
a pressure-reducing solenoid valve provided in a flow channel connecting the wheel cylinder and a reservoir,
wherein the setting unit is configured to reduce the supply amount by the first supply unit and open the differential solenoid valve and the pressure-reducing solenoid valve when a hydraulic pressure in the wheel cylinders is reduced in the state where the first supply unit and the second supply unit are driven.

11. The vehicle braking device according to claim 10, further comprising:
a control unit configured to reduce a ratio of a hydraulic pressure generated by the first supply unit in the wheel cylinder and to increase a ratio of a hydraulic pressure generated by the second supply unit in the wheel cylinder when the first supply unit becomes in a prescribed state.

12. The vehicle braking device according to claim 2, further comprising:
a pressure-reducing solenoid valve provided in a flow channel connecting the wheel cylinder and a reservoir,
wherein the setting unit is configured to reduce the supply amount by the first supply unit and open the differential solenoid valve and the pressure-reducing solenoid valve when a hydraulic pressure in the wheel cylinders is reduced in the state where the first supply unit and the second supply unit are driven.

13. The vehicle braking device according to claim 2, further comprising:
a control unit configured to reduce a ratio of a hydraulic pressure generated by the first supply unit in the wheel cylinder and to increase a ratio of a hydraulic pressure generated by the second supply unit in the wheel cylinder when the first supply unit becomes in a prescribed state.

14. A vehicle braking device comprising:
a first supply unit configured to supply fluid to a main flow channel connected to a wheel cylinder of a vehicle;
a differential solenoid valve provided in the main flow channel, the differential solenoid valve configured to generate a differential pressure across the differential solenoid valve;
a second supply unit configured to supply fluid to the wheel cylinder by drawing at least some fluid supplied from the first supply unit through a branch flow channel branched off from the main flow channel upstream of the differential solenoid valve;

a setting unit configured to set a supply amount of fluid supplied by the first supply unit in accordance with a draw amount of fluid drawn by the second supply unit; and a pressure-reducing solenoid valve provided in a flow channel connecting the wheel cylinder and a reservoir, wherein the setting unit is configured to reduce the supply amount by the first supply unit and open the differential solenoid valve and the pressure-reducing solenoid valve when a hydraulic pressure in the wheel cylinders is reduced in the state where the first supply unit and the second supply unit are driven.

\* \* \* \* \*